Dec. 8, 1931.    C. A. ANDERSON    1,835,255
TEST SET
Filed Jan. 2, 1929
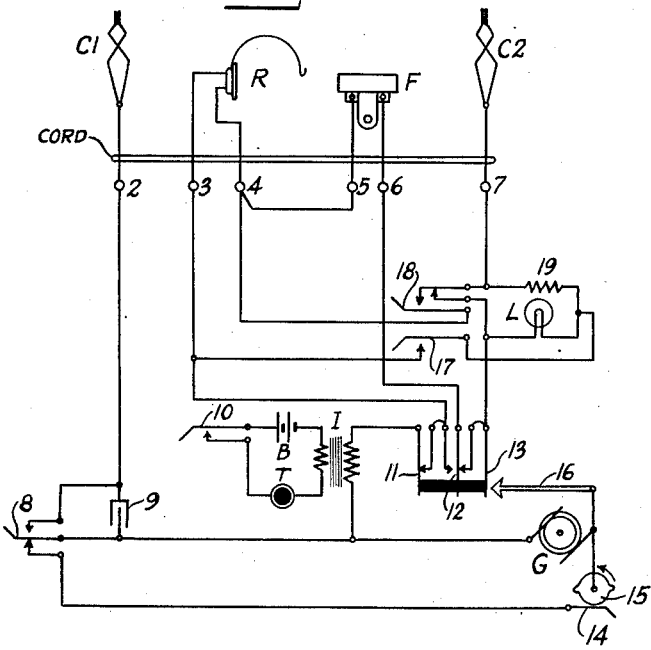
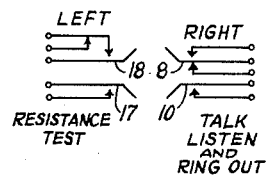
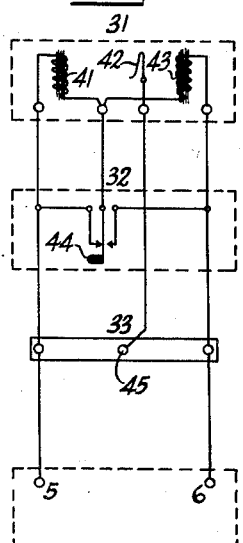
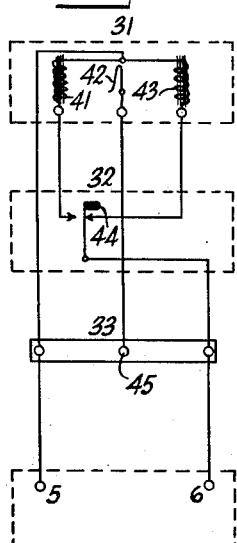
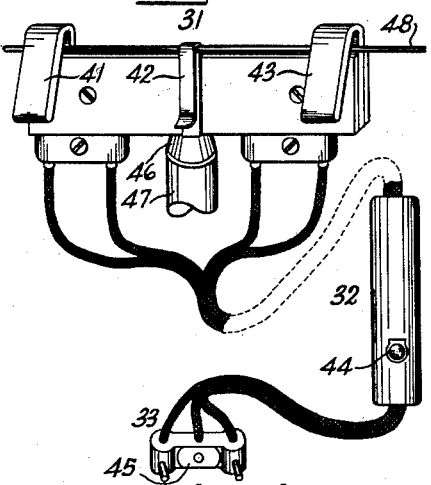
Inventor
Clarence A. Anderson Patented Dec. 8, 1931

1,835,255

UNITED STATES PATENT OFFICE

CLARENCE A. ANDERSON, OF CHICAGO, ILLINOIS, ASSIGNOR, BY MESNE ASSIGNMENTS, TO AMERICAN ELECTRIC COMPANY, INC., OF CHICAGO, ILLINOIS, A CORPORATION OF DELAWARE

TEST SET

Application filed January 2, 1929. Serial No. 329,723.

The present invention relates to test sets for use in locating faults in transmission lines, especially telephone and telegraph transmission lines and it may be considered as an improvement on the test set disclosed in the pending application of Clarence A. Anderson, S. N. 203,654, filed July 5, 1927, now Patent No. 1,778,207, Oct. 14, 1930.

One object of the present invention is to still further improve the circuit arrangement and to arrange the control thereof so that the number of controls is reduced to a minimum.

A further object is the production of a novel circuit arrangement whereby the operator of the test set may judge by visual and audible signals or by an audible signal alone the distance from the testing point to a fault on a line.

A further object is the production of a novel arrangement for determining the direction of a fault on a line by making a connection to the line and by performing an independent switching operation.

It is a further object to provide a unit which can be applied to existing test sets in place of the finder coil originally supplied and by which direction tests can be made without changing line clips.

A feature of the new finder-coil attachment is that it is provided with a socket and a detachable handle which in combination with a long cord enables a lineman who has climbed a pole to reach the most distant wire on a crossarm, or, if desired, a longer handle may be used so as to reach wires from the ground without climbing the pole at all.

Other objects and features, for the most part incidental to the ones herinbefore set forth, will appear upon a further perusal of the specification in connection with the accompanying drawings.

Referring now to the accompanying drawings comprising Figs. 1–5, they show by means of the usual circuit diagrams and mechanical drawings a sufficient amount of testing apparatus to enable the features of the invention to be understood.

Fig. 1 is the circuit drawing showing a complete circuit of the new and improved test set with the line clips C1 and C2, together with the receiver R and the finder F connected to the terminals 2—7 by means of a flexible cord.

Fig. 2 shows the relative location of the springs of the single manually operable key of the new test set and also indicates the operations to be performed with the key in any one of its three positions. It may be pointed out at this time that the key is preferably arranged so that it must be held in its left position or in its right position and returns to its normal position upon being released.

Fig. 3 is a circuit drawing of the new double finder attachment; Fig. 4 is a drawing of an alternative circuit; and Fig. 5 is a mechanical drawing showing a perspective view of the attachment placed in operative relation to the conductor 48.

In the following description, attention will first be directed to the new test set of Fig. 1 with the standard type of finder F, and the attachment shown in Figs. 3—5 will be described after the description of Fig. 1 is completed.

Description of the test set

In order to enable the subsequent description to be understood best it will be pointed out at this time that the prime function of the test set is to enable a lineman or other person to take the test set to a line in trouble (consisting of a foreign connection to a conductor thereof, which foreign connection may be to the other conductor of the line or to earth or to a conductor of another line) and determine the direction from the point of test to the trouble, when the line is being tested at an intermediate portion, and to give an indication as to the approximate distance from the test point to the fault. Incidental functions to be performed by the test set include listening in (monitoring) on a line before testing it to determine whether or not the line is in use, setting up a regular talking circuit over the line in case the lineman using the test set desires to converse with an operator or wire chief over a line under test or some other line, and ringing over the line in the usual way by applying the usual type of alternating ringing current thereto.

Monitoring

When the testing lineman wishes to listen in across the two conductors of a telephone line he connects the clip C1, Fig. 1, to one conductor of the line and connects the clip C2 to the other conductor of the line and listens in the receiver R. A monitoring circuit exists at this time across the two clips which includes the condenser 9, the right hand winding of the induction coil I, spring 11 and its contact, the receiver R, connected to the terminals 3 and 4, the finder coil F, connected to terminals 5 and 6, the spring 12 and its normal contact, and the contacts controlled by key spring 18.

Ringing over a line

Assuming that the lineman, hearing no conversation on the line, desires to ring on the line (usually to signal an operator in an exchange), he operates the key to the right, operating the springs 8 and 10 as may be seen from Fig. 2. The spring 8 disconnects the generator commutator, comprising the rotating member 15 and the spring 14, from around the generator G and it places a shunt around the condenser 9. The spring 10 energizes the transmitter T from the battery B by way of the left hand winding of induction coil I. The operation of spring 10 is merely incidental at this time. With the circuit thus prepared by the operated spring 8, the lineman turns the crank (not shown) of the generator G in the usual manner, whereupon the crank member 16 moves to the left and operates the springs 11, 12 and 13 to the left. Springs 11 and 12 open the talking bridge across the clips C1 and C2 and crank member 16, contacting with spring 13, connects the right-hand terminal of the generator G to clip C2 by way of contacts controlled by spring 18 and the terminal 7. The left-hand terminal of the generator G is now connected to the clip C1 by way of contacts of the spring 8 and terminal 2. As a result, the ringing current passes out over the line by way of clips C1 and C2 in the usual manner.

When the generator crank is released, the crank member 16 moves to the position shown in the drawings and allows the springs 11, 12 and 13 to restore. The key is released and restores to normal position.

Conversing over a line

With the clips C1 and C2 connected to the line and with the key at normal, the lineman may listen in by means of the receiver R and hear the response of the operator or other person, whereupon the key is again thrown to the right operating the springs 8 and 10 to enable the lineman to converse over the line. The operation of spring 10 is incidental at this time and spring 8 energizes the transmitter T again from the battery B by way of the primary winding of the induction coil I. The listening circuit is the same as that described in connection with monitoring and when the lineman speaks into the transmitter T the voice current passes through the talking circuit due to the usual action of the induction coil I, whose secondary winding is included in the talking circuit.

Direction test

As indicated by the note in Fig. 2, the direction test is made with the key at normal. One line clip is placed on the conductor under test and the finder F is clipped around the wire on one side or the other of the line clip. The other line clip is connected to the other conductor of the same line, to a conductor of another line, or to ground, depending upon the particular fault which exists. Having thus prepared the circuit, the lineman turns the crank of the generator G while listening for clicks in the receiver R. If clicks are heard, the fault is on the same side of the line clip as the finder coil, while if the click is not heard, the fault is on the other side of the line clip. To verify this, the finder is placed on the other side of the line clip, or else the line clip is placed on the other side of the finder. Clicks will then be heard in the receiver with the finder in this position.

Regarding the furnishing of tone current to the clips C1 and C2, it may be pointed out that, when the crank of the generator G is turned, the right-hand terminal of the generator is connected as before described by the member 16 and the spring 13 to the clip C2 by way of contacts controlled by spring 18 and through terminal 7. The left hand terminal of the generator G is connected at this time to the clip C1 by way of the condenser 9 and the terminal 2. The current flowing from the generator G to the test circuit by way of the clips C1 and C2 therefore passes through the condenser 9. The condenser thus becomes charged during the building up of potential by the generator G and when this potential is at the highest point, or thereabout, one of the two projections of the rotating member 15 (rigidly secured on the same shaft with the generator G) contacts with the spring 14, abruptly short circuiting the generator G so as to permit the condenser 9 to abruptly discharge in the test circuit to produce an abrupt current rise, which is the usual expedient resorted to to obtain the distinct clicking tone in the receiver.

Resistance test

In order to make a test as to the resistance of a fault, including the line resistance between the test point and the fault, the clips C1 and C2 are placed in testing position (across the line if the fault is a connection between the two conductors of a line) and the key is thrown to the left, operating springs 17 and 18. Spring 17 connects terminal 3 of the receiver R to the junction of the lamp L and the resistance 19, and spring 18 connects the terminal 4 of the receiver R to the other terminal of the resistance 19, bridging the receiver around this resistance. The separation of the normally closed contacts controlled by spring 18 opens the normally applied shunt around the lamp L and the resistance 19 with the result that when the generator G is operated the current flow over the line, as chopped up by the commutator 15, passes through the lamp L and through the resistance 19. If the resistance of the fault and the line conductors included is fairly low the lamp L becomes lighted to a brilliancy depending upon the current flow. An experienced test man can judge the resistance fairly accurately by this method. If the resistance is sufficiently great the lamp L does not become lighted at all and the tester relies upon the intensity of the tone produced in the receiver R to the judge the resistance of the circuit under test. The lamp L and the resistance 19 are preferably so chosen that the lamp L is lighted if the resistance is about 1,000 ohms or less and so that the tone is heard in the receiver R if the resistance is about 1,000,000 ohms or less. In this way, the tester can obtain a fair estimate of the condition of a line and in the case of a grounded line can usually guess with reasonable accuracy whether the line is grounded by actual contact with the ground or in some other way, such as a branch of a tree in contact with the line.

*Using the double-finder attachment*

Referring now particularly to Fig. 5, which is a mechanical drawing of the double-finder attachment in place on a conductor 48 to be tested, and referring also to Figs. 3 and 4, which are circuit diagrams, the new attachment will be explained. The attachment comprises three parts 31, 32 and 33, together with interconnecting cord. 31 is the double finder attachment and fits over a wire 48 to be tested, as shown in the drawings; 32 is a hand-operated switch having a push button 44; while 33 is an attachment plug terminating the three conductor cord connecting it with the part 32.

By comparing Figs. 3, 4 and 5 it will be noted that the projections 41 and 43 of Fig. 5 are finder coils as shown in Figs. 3 and 4 and that each of these finder coils has an iron core. The central portion, of 41 for example, is soft iron over which an insulated winding is placed and a layer of insulation is fitted on over the winding to serve as a protection therefor. The hook 42 is a metallic conducting member and it hooks over a wire 48 to be tested and makes the electrical contact therewith.

Referring now to the circuit diagram shown in Fig. 3, when this attachment is to be used, the finder F of Fig. 1 is removed, by loosening of the usual binding screws, from the cord connected to the terminals 5 and 6, leaving the two conductors of the cord attached to the test set. The two conductors from which the finder F is detached are next attached to the two outside terminals of the attachment plug 33 as shown in Fig. 3. One clip, the clip C1 for example, of the test set of Fig. 1 is clipped over the metallic conducting terminal 45 so as to make contact therewith. When the double finder coil 31 is put over a line conductor as shown in Fig. 5 the clip secured to the terminal 45 is metallically extended by way of the interconnecting conductor and the clip 42 to the conductor such as 48. The other clip C2 is connected so as to form the usual return circuit, either to the other conductor of the same line, or to ground, or to some other conductor as the case may be.

With the attachment thus connected, operating the generator G results in a current flow between the clip C1 and conductor such as 48 under test by way of terminal 45, the interconnecting conductor, and the contact clip 42. The current flows in one direction or the other over the conductor under test depending upon the direction toward the fault. It will be noted that the finder coil 41 is normally short circuited and the circuit arrangements are such that the finder coil 43 is normally effective to send current through the receiver R by way of terminals 5 and 6 in case the current flows from the clip 42 to the right over the conductor under test. If the current, however, is flowing to the left, no tone is heard because coil 41 is short circuited and coil 43 is not effected. In this case, the tester operates the push button 44 of the clip 32 and shifts the short circuit from coil 41 to the coil 43, rendering the coil 41 effective. The tone is now heard and the direction to the fault is established without the shifting of clips required in case the simple finder coil F of Fig. 1 is used.

It will be noted that the arrangement of Fig. 4 is similar to the arrangement of Fig. 3 except that the finder coil 41 is normally open circuited instead of short circuited and coil 43 is normally connected up through contacts of the push button 44. When the push button is operated, finder coil 43 is open circuited and coil 41 is connected up instead. This alternative arrangement may be slightly more desirable in certain cases, as in Fig. 3 a high resistance at a contact of the spring 44 may cause a false indication, while the same condition existing in the arrangement of Fig. 4 merely results in a weakening of the tone heard in the coil in use but does not permit of any tone to be heard in the coil cut out of use.

It will be noted that the finder coil combination 31 of Fig. 5 is provided with a socket 46 into which the end of a handle 47 may be inserted. This permits the tester to reach from wire to wire without changing his position on a pole or if a long handle is used it permits him to test conductors while standing on ground.

What is claimed is:

1. A test set for locating the direction of an unstandard condition of a line comprising an exploring device adapted to be placed in position to inductively receive current from the line under test, means for detecting current induced in said exploring device, a hand generator for producing current, switching means controlled by the operator of said generator for connecting the generator to the line under test, other switching means controlled independent of the operation of said generator, and circuit connections between said exploring device and said current detecting means controlled by the operation of said other switching means whereby the direction to the unstandard condition may be determined.

2. In a line testing set for use in determining the direction from a given point toward a fault on a line, a current source, means for connecting one pole of said current source to a line, two exploring coils adapted to be associated with said lines on the two sides respectively of the said connection, a current detecting device, and switching means for placing said detecting device under the control of said exploring devices alternately while current is flowing over the line from the said one pole of the current source through the fault.

3. As an article of manufacture, a lineman's test set comprising of a pair of clips, a receiver, a finder coil, a hand generator, a transmitter, an induction coil, a condenser, a source of current for energizing said transmitter, a manually operable key having a normal position and two off-normal positions, and suitable interconnections controlled by said key in its said positions whereby a telephone line may be listened upon for monitoring purposes, may be talked over, may be supplied with ringing current from said hand generator, and may be tested for a fault together with the direction thereto.

4. As an article of manufacture, two exploring coils mechanically attached together and arranged to be placed over a conductor, an attachment plug having terminal facilities and connected to said device by means of a flexible cord, and a manual switching device connected in said cord between the first named device and the attachment plug for effectively connecting one or the other of said coils to said plug.

5. In a line test set arranged to be connected to a line to be tested, a manually operable key having a normal position and two off-normal positions, contacts on said key operated with the key in normal position for completing a circuit by means of which conversation occurring over the line to which the test set is connected may be heard, means for altering said circuit so that a direction test may be applied to the line to ascertain the direction toward a fault existing thereon, circuit-changing contacts operated with the key in one off-normal position for completing a circuit for determining the resistance to and including the fault, and contacts operated with the key in its other off-normal position for completing a circuit by means of which the tester may converse over the line under test and apply ringing thereto.

6. As an article of manufacture, two exploring coils and a contact device mechanically attached together and arranged to be placed over a conductor, an attachment plug having terminal facilities and connected to said coils and said device by means of a flexible cord, and a a manual switching device connected in said cord between the first-named device and the attachment plug.

7. An exploring device for determining the direction of a fault in a conductor, said device comprising two separate exploring coils rigidly attached to opposite ends of a spacing member, and a contact element rigidly attached to said member at a point between said coils.

8. An exploring device adapted to be attached to an electrical conductor for determining the direction of a fault therein, said device comprising two separate exploring coils attached to a spacing member, and a contact element adapted to engage the conductors attached to said member at a point between said coils.

9. An exploring device for determining the direction of a fault in a conductor, said device comprising two separate exploring coils provided with cores of magnetic material attached to a spacing member at different points, and a contact element attached to said member at a point between said coils.

10. An exploring device for determining the direction of a fault in a conductor, said device comprising two separate exploring coils shaped to partially surround the conductor under test, a spacing member for maintaining said coil in fixed relationship, and a contact member for engaging the conductor under test.

11. An exploring device for determining the direction of a fault in a conductor, said device comprising two exploring coils, a spacing member for controlling the relative position of said coils with respect to each other, and a clamp for controlling the relative positions of said coils with respect to a conductor under test.

12. An exploring device for determining the direction of a fault in a conductor, said device comprising two exploring coils adapted to partially surround a conductor under test, a spacing member for controlling the relative positions of said coils with respect to each other, and a contact member for engaging the conductor under test and for controlling the relative positions of said coils with respect to said conductor.

13. An exploring device for determining the direction of a fault in a conductor, said device comprising two separate exploring coils adapted to partially surround a conductor under test, and a spacing member for controlling the relative position of the coils with respect to each other and for maintaining the axes of said coils substantially perpendicular to the conductor under test.

14. A testing set for locating the direction of an unstandard condition on a line, said set comprising an exploring device consisting of two separate exploring coils adapted to be placed in position to inductively receive current from a line under test, means for producing current and for applying it to the line under test at a point between said coils, and current detecting means adapted to be connected with said coils separately.

15. A testing set for locating the direction of an unstandard condition on a line, said set comprising an exploring device consisting of two separate exploring coils adapted to be placed in position to inductively receive current from a line under test, means for producing current and for applying it to the line under test at a point between said coils, current detecting means normally connected to one of said coils, and a switching device for disconnecting said detecting means from said one coil and for connecting it to the other coil.

16. A testing set for locating the direction of an unstandard condition on a line, said set comprising an exploring device consisting of two separate exploring coils adapted to be placed in position to inductively receive current from a line under test, means for producing current and for applying it to the line under test at a point between said coils, current detecting means associated with said coils, and a switching device for disabling said coils one at a time.

17. A testing set for locating the direction of an unstandard condition on a line, said set comprising an exploring device consisting of two separate exploring coils adapted to be placed in position to inductively receive current from a line under test and a contact member for engaging the conductor at a point between said coils, means for producing current and for applying it to the line under test through said contact member, and current detecting means adapted to be connected to said coils separately.

18. A test set for locating the direction from a given point of an unstandard condition on a metallic conductor comprising a hand generator operable only in one direction, contacts controlled by the generator for connecting the generator to said conductor, a pick-up coil adapted to be placed to inductively receive current from the conductor, means for detecting current induced in said coil, and manually controlled switching means for altering the connection of the pick-up coil with said current detecting means whereby the direction of the unstandard condition may be determined.

In witness whereof, I hereunto subscribe my name this 31st day of December, A. D. 1928.

CLARENCE A. ANDERSON.